(No Model.) 2 Sheets—Sheet 1.
J. B. JARMIN.
CHECK ROW CORN PLANTER ATTACHMENT.
No. 496,415. Patented May 2, 1893.
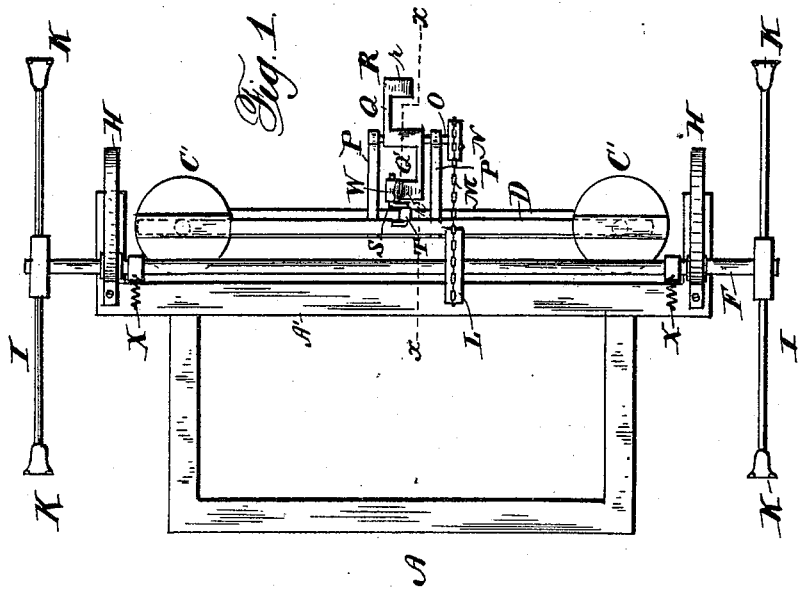
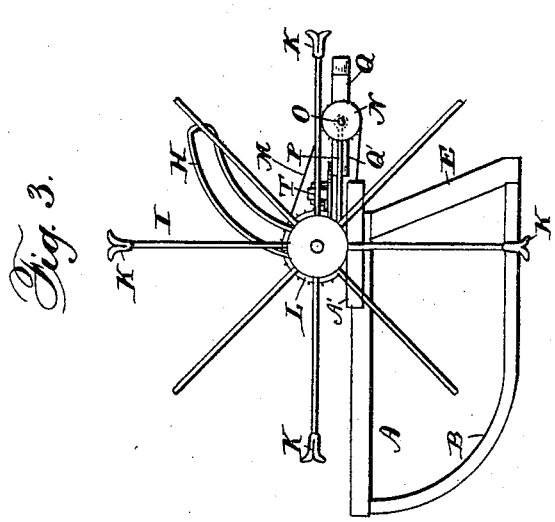
Witnesses:
W. E. Poulter
W. E. Cowell
Inventor:
James B. Jarmin
by H. D. Willson
Attorney (No Model.) 2 Sheets—Sheet 2.

J. B. JARMIN.
CHECK ROW CORN PLANTER ATTACHMENT.

No. 496,415. Patented May 2, 1893.

Witnesses:-
W. E. Poulter
H. E. Cowell

Inventor:-
James B. Jarmin,
by H. D. Wilson
Attorney

UNITED STATES PATENT OFFICE.

JAMES B. JARMIN, OF OSCEOLA, NEBRASKA.

CHECK-ROW CORN-PLANTER ATTACHMENT.

SPECIFICATION forming part of Letters Patent No. 496,415, dated May 2, 1893.

Application filed December 3, 1892. Serial No. 453,994. (No model.)

*To all whom it may concern:*

Be it known that I, JAMES B. JARMIN, a citizen of the United States, residing at Osceola, in the county of Polk and State of Nebraska, have invented certain new and useful Improvements in Check-Row Corn-Planter Attachments; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention has relation to check-row attachments for corn planters, and among the objects in view is to provide an attachment of the class described that is extremely simple in construction, inexpensive to manufacture, adapted to work successfully over rough ground, and that may be readily attached to any ordinary planter.

A further object of the invention is to dispense with the use of the ordinary check-row wire, and with the described and other objects in view, the invention consists in the construction, arrangement and combination of parts, all as hereinafter fully described, illustrated in the accompanying drawings, and pointed out in the appended claims.

Figure 2:
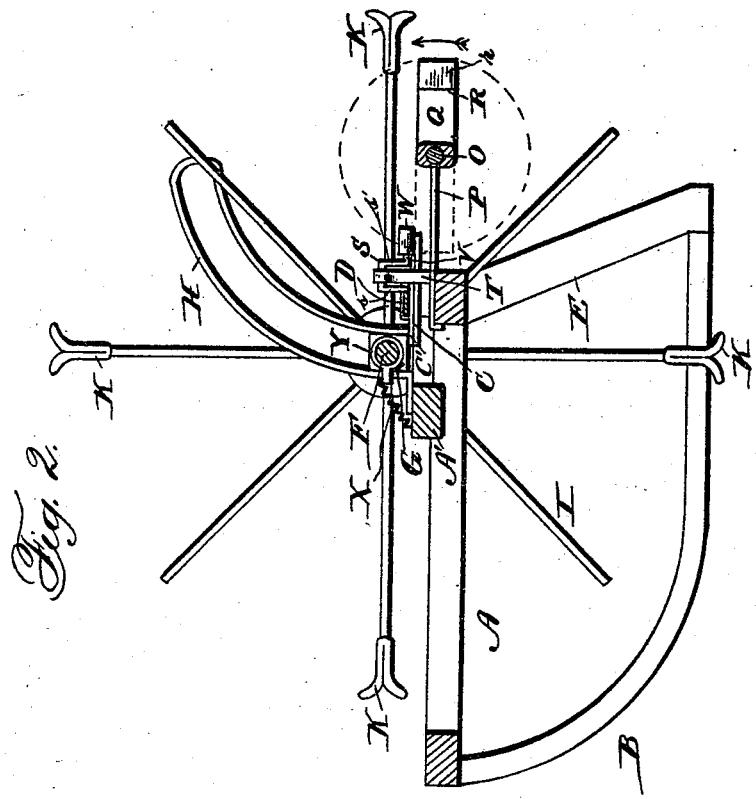
Figure 4:
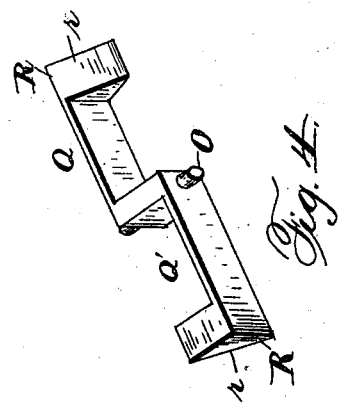

In the drawings: Figure 1 is a plan view of my improved check-row attachment and so much of an ordinary planter as is necessary to illustrate the application of my invention thereto. Fig. 2 is a vertical section thereof on the line $x$—$x$ of Fig. 1. Fig. 3 is a side elevation of Fig. 1. Fig. 4 is a detail view on an enlarged scale of part of the mechanism for actuating the slide-plate.

Referring to said drawings, A indicates a sled frame of an ordinary corn planter provided with the usual runners B. Upon the frame A at the desired distance apart are adapted to be mounted suitable seed boxes (not shown).

D indicates the ordinary slide-plate which extends transversely of the machine and is adapted to control the dropping of the seed in the usual manner, the ends of the slide-plate being adapted to slide between the seed plates C' and the bottoms C of the seed-boxes. If desired the lower plates C might in practice, be made to constitute the dropping plates, and the upper plates C', the bottoms of the seed boxes. In fact, any construction and arrangement of seed-boxes and dropping plates may be employed, provided the dropping of the corn can be controlled by the slide plate as usual in this class of planters.

E are the seed tubes which communicate at their upper ends with the openings in the seed plates.

For the purpose of actuating the slide-plate at determined intervals during the progress of the planter across the field and simultaneously marking the hills that have been dropped, I employ the following mechanism, constituting my improved attachment:—Extending transversely of the planter frame and projecting some distance beyond the sides of the latter is a shaft F said shaft being provided toward its outer ends with bearing blocks G, which are mounted in curved guides H secured to the frame A' of the attachment secured to the planter frame, and which blocks are adapted to freely move within the guides for a purpose presently apparent. Rigidly secured upon the shaft at the outer ends thereof are the spider wheels I I, which are adapted to serve as marker wheels for marking the hills that have been dropped, and for this purpose each of said wheels is provided with four marker plates or spurs K, secured to the alternate arms of said wheels. The marker wheels are made of suitable size to adapt them to travel upon the ground and, by means of the markers to mark the ground at points adjacent to the hills that have been dropped. Secured upon the shaft F intermediate the guides, is a sprocket wheel L which is geared by a sprocket chain M to a sprocket wheel N mounted upon one end of a short shaft O journaled in bearing arms P secured to the frame. Secured to the shaft O between the arms P are crank arms Q Q' integral with each other, and arranged diametrically opposite to each other as shown. The outer end of each arm Q and Q' is provided with a triangular shaped head or spur R the inclined bearing face $r$, of each of which is adapted to actuate in the manner presently described, a U-shaped rock arm or lever S pivotally supported in the upper end of a short standard T secured to the frame A. The branch $s$, of arm S enters a perforation in the slide plate D, and the other branch s' of said arm S is bent rearwardly to form a crank arm V which is provided with an antifriction roller W. The relative positions of the crank arm V and roller W with respect to the arms Q Q' is such that when the latter arms are turned in the direction of the arrow, the bearing face r of arm Q will strike against roller W and swing the lever S in one direction and with it simultaneously the slide plate D until the bearing face of arm Q clears the roller W. The bearing face of arm Q' next strikes the roller W and swings the lever S and with it the slide plate in the opposite direction. This operation of reciprocating the slide plate continues during the progress of the planter across the field, two hills of corn being simultaneously dropped at each sliding movement of the plate,—one from each of the seed boxes.

The actuating mechanism for the slide plate and the markers on the marker wheels are so arranged relatively to each other that at the moment the hills are dropped a marker of each wheel will be on the ground and mark the same adjacent to said hills.

The marker wheels are mounted upon the shaft F at such a distance beyond the sides of the frame that they will be half way between the row that is planted and the next row, so that one of said marker wheels travels back in the track made by the other wheel when the planter is traveling in the opposite direction across the field, whereby the corn will be dropped straight both ways.

By reason of the bearing blocks G being loosely seated in the guides H the shaft F will be permitted to rise and fall owing to inequalities in the ground, without interfering with the dropping operation. For the purpose of maintaining the marker wheels in contact with the ground, I employ coiled springs X adjacent to the guides, one end of each of said springs being secured to the frame A and the opposite end to sleeves Y mounted upon the shaft F.

The sprocket wheel L is twice the diameter of the like wheel N, so that the shaft O will be revolved twice during each revolution of the main shaft F.

What I claim, and desire to secure by Letters Patent, is—

1. In a check row attachment for corn planters, the combination of a marker wheel shaft, marker wheels mounted upon said shaft, bearing blocks on said shaft, curved guides arranged near opposite ends of the shaft and in which guides said blocks are slidingly mounted, coiled springs arranged near the ends of the shaft and acting upon the same to normally maintain it in a lowered position, a rock arm or lever, a revoluble shaft having arms adapted to successively actuate the rock arm in opposite directions, a sprocket wheel upon said shaft, a second sprocket wheel upon the marker wheel shaft, and a chain gearing said sprocket wheels together.

2. In a check-row attachment for corn planters, the combination with a marker wheel shaft, marker wheels mounted upon said shaft, guides in which said marker wheel shaft is slidingly mounted, coiled springs secured to the attachment frame, and adapted to maintain the marker wheels upon the ground, a rock-arm or lever, a shaft provided with arms adapted to actuate said rock arm in opposite directions, a sprocket-wheel upon said shaft, a second sprocket-wheel upon the marker wheel shaft, and a chain gearing said sprocket wheels together, for the purpose specified.

3. In a check-row attachment for corn planters, the combination of the frame, the upwardly-extending guides, the marker wheel shaft, slidingly mounted in said guides, marker wheels mounted upon said shaft, sleeves upon said shaft, coiled springs secured at one end to the said sleeves and at the opposite end to the frame, rearwardly-extending arms secured to said frame, a shaft mounted in said arms, arms mounted upon the latter shaft and provided each with an inclined bearing face a standard on the frame, a rock-arm or lever mounted on said standard and adapted to be operated by the bearing faces in the manner described, a sprocket-wheel mounted upon the shaft carrying the said operating arms, a sprocket wheel on the marker wheel shaft, and a chain gearing said sprocket wheels together, for the purpose specified.

In testimony whereof I affix my signature in presence of two witnesses.

JAMES B. JARMIN.

Witnesses:
EUGENE A. WALROTH,
J. A. SHEESKY.